US012760726B2

(12) United States Patent
Byeon

(10) Patent No.: US 12,760,726 B2
(45) Date of Patent: Oct. 13, 2026

(54) ELASTIC MEMBER AND PUMP ASSEMBLY COMPRISING SAME

(71) Applicant: KR CO., LTD., Bucheon-si (KR)

(72) Inventor: Jae Sam Byeon, Yangpyeong-gun (KR)

(73) Assignee: KR CO., LTD., Bucheon-si (KR)

( * ) Notice: Subject to any disclaimer, the term of this patent is extended or adjusted under 35 U.S.C. 154(b) by 181 days.

(21) Appl. No.: 18/274,644

(22) PCT Filed: Sep. 24, 2021

(86) PCT No.: PCT/KR2021/013004
§ 371 (c)(1),
(2) Date: Jul. 27, 2023

(87) PCT Pub. No.: WO2023/048303
PCT Pub. Date: Mar. 30, 2023

(65) Prior Publication Data

US 2024/0084790 A1 Mar. 14, 2024

(51) Int. Cl.

| | |
|---|---|
| ***F04B 45/02*** | (2006.01) |
| ***B05B 11/00*** | (2023.01) |
| ***B05B 11/10*** | (2023.01) |
| ***B65D 1/02*** | (2006.01) |
| ***B65D 1/32*** | (2006.01) |

(Continued)

(52) U.S. Cl.
CPC .......... *F04B 45/02* (2013.01); *B05B 11/0005* (2013.01); *B05B 11/1035* (2023.01); *B05B 11/1077* (2023.01); *B65D 1/0292* (2013.01); *B65D 1/32* (2013.01); *B65D 21/086* (2013.01); *F16F 1/373* (2013.01); *F16F 9/38* (2013.01); *F04B 9/14* (2013.01); *Y10S 215/90* (2013.01);

(Continued)

(58) Field of Classification Search
CPC ...... B65D 1/0292; B65D 21/086; B65D 1/32; Y10T 29/49877; Y10T 428/2457; F16F 9/38; F16F 1/373; Y10S 215/90; Y10S 297/08; F04B 45/02; F04B 9/14; B05B 11/1035; B05B 11/0005; B05B 11/1077
See application file for complete search history.

(56) References Cited

U.S. PATENT DOCUMENTS 2,876,801 A * 3/1959 November .............. F16L 11/15 138/121
3,301,293 A * 1/1967 Santelli ................ B65D 1/0292 297/DIG. 8

(Continued)

FOREIGN PATENT DOCUMENTS

JP 2015-075215 A 4/2015
KR 10-2016-0097607 A 8/2016

(Continued)

*Primary Examiner* — Peter J Bertheaud
(74) *Attorney, Agent, or Firm* — Bridgeway IP Law Group, PLLC; Sang Ho Lee; Hyun Woo Shin

(57) ABSTRACT

Provided is an elastic member according to an embodiment of the present invention. In the elastic member, a protrusion portion formed outward and a recessed portion formed inward may be repeatedly formed in a longitudinal direction, an outer groove may be formed in the protrusion portion along an outer circumference of the elastic member, an inner groove may be formed in the recessed portion along an inner circumference of the elastic member and guide bending-deformation of the protrusion portion and the recessed portion during elastic compression.

18 Claims, 10 Drawing Sheets

(51) Int. Cl.

| | |
|---|---|
| ***B65D 21/08*** | (2006.01) |
| ***F04B 9/14*** | (2006.01) |
| ***F16F 1/373*** | (2006.01) |
| ***F16F 9/38*** | (2006.01) |

(52) U.S. Cl.
CPC ........ *Y10S 297/08* (2013.01); *Y10T 29/49877* (2015.01); *Y10T 428/2457* (2015.01)

(56) References Cited

U.S. PATENT DOCUMENTS

| | | | | |
|---|---|---|---|---|
| 3,559,692 | A * | 2/1971 | Mantelet | A47L 9/24<br>138/121 |
| 4,079,757 | A * | 3/1978 | Fischer | F16J 3/041<br>138/121 |
| 10,190,686 | B2 * | 1/2019 | Nagamachi | F16J 3/041 |
| 2017/0326567 | A1 | 11/2017 | Santagiuliana | |

FOREIGN PATENT DOCUMENTS

| | | | |
|---|---|---|---|
| KR | 10-1660678 | B1 | 9/2016 |
| KR | 10-2044128 | B1 | 11/2019 |
| KR | 10-2022-0034382 | A | 3/2022 |

* cited by examiner

ELASTIC MEMBER AND PUMP ASSEMBLY COMPRISING SAME

TECHNICAL FIELD

The present invention relates to an elastic member and a pump assembly including the same.

BACKGROUND ART

Generally, a pump container is configured to discharge content to the outside through a pumping operation of a pump assembly coupled to an upper portion of a container body and includes the container body in which the content is stored, the pump assembly which is coupled to the upper portion of the container body, forms a vacuum in the container body, and pulls the content upward through a pumping operation, and a button which is positioned on an upper portion of the pump assembly moved upward or downward according to a pressure of a user and transmits the pressure to the pump assembly.

In this case, the pump assembly performs the pumping operation to discharge the content stored in the container body to the outside and, to this end, may include a spring therein which provides an elastic force. Since the spring is generally formed of a metal material, a manufacturing cost of the spring is high, and since the pump assembly is formed of different materials such as a plastic material and a metal material, the pump assembly should be separated and discarded for recycling, and thus there is a problem that the recycling is not easy.

A bellows type elastic member formed of a plastic material has been proposed to solve the problem. In the bellows type elastic member, screw threads and screw valleys are repeatedly formed in a longitudinal direction, and elastic deformation occurs around the screw threads and screw valleys. However, there is a problem that irregular deformation occurs when the elastic member like the bellows type elastic member is pressurized and elastically compressed. Specifically, in the elastic member, the screw threads are equally not bent, and a specific screw thread is bent first, then the other screw threads are bent, and thus there is a problem that the elastic member may not be smoothly and continuously compressed.

DISCLOSURE

Technical Problem

Accordingly, the present invention is directed to providing an elastic member and a pump assembly including the same in order to solve the problem.

Technical objectives of the present invention are not limited to the technical objectives described above, and the other technical objectives which are not described may be clearly understood by those skilled in the art from the following descriptions.

Technical Solution

One aspect of the present invention provides an elastic member. In the elastic member, a protrusion portion formed outward and a recessed portion formed inward are repeatedly formed in a longitudinal direction, an outer groove is formed in the protrusion portion along an outer circumference of the elastic member, an inner groove is formed in the recessed portion along an inner circumference of the elastic member and guides bending-deformation of the protrusion portion and the recessed portion during elastic compression.

A pair of outer protrusion potions may be formed on the protrusion portion around the outer groove, and during the elastic compression, the outer protrusion portions may be moved away from each other around the outer groove, and the protrusion portion may be bending-deformed.

A pair of inner protrusion potions may be formed on the recessed portion around the inner groove, and during the elastic compression, the inner protrusion portions may be moved away from each other around the inner groove, and the recessed portion may be bending-deformed.

An auxiliary groove may be formed in the recessed portion along the outer circumference of the elastic member, and during the elastic compression, the auxiliary groove may allow a compression distance of the elastic member to increase.

At least one of an elastic force, a compression distance and a bending order may be adjusted by a recess depth and a recess size of at least one of the outer groove and the inner groove.

A thickness of the elastic member may increase from the recessed portion toward the protrusion portion and decrease from the protrusion portion toward the recessed portion.

The elastic member may be a bellows type elastic member, wherein the protrusion portion and the recessed portion may be formed along the circumference of the bellows type elastic member to seal a side surface of the bellows type elastic member.

Another aspect of the present invention provides a pump assembly. The pump assembly includes an elastic member according to an embodiment of the present invention, a cylinder of which an upper portion and a lower portion are open and in which a hollow is formed, a seal cap provided on an inner wall of the cylinder, a supporting part which supports the elastic member from under the elastic member, a piston rod in which an inlet opened or closed by the seal cap is formed in a lower end of the piston rod and a passage connected to the inlet is formed to extend to an upper end of the piston rod, and a stem coupled to the piston rod to move upward or downward with the piston rod, wherein the elastic member is provided between the stem and the supporting part and provides an elastic force from the supporting part toward the stem.

At least some regions may protrude from un upper end of the supporting part to form at least one communication hole between protruding regions, and thus an inside and an outside of the elastic member may air-communicate with each other.

A communication hole which communicates with a container coupled to the pump assembly may be formed in an upper end of the cylinder to eliminate a negative pressure in the container.

Still another aspect of the present invention provides a content container. The content container includes a pump assembly according to an embodiment of the present invention, a container portion in which a content is accommodated, a head part coupled to the container portion to fix the pump assembly, and a nozzle which receives an external force and transmits the external force to the pump assembly and through which the content is discharged.

Advantageous Effects

According to the present invention, since an elastic member is formed of a material such as a soft plastic, a cost of the elastic member is economical, and the elastic member is eco-friendly.

In addition, according to the present invention, since protrusion portions and recessed portions are repeatedly formed in a longitudinal direction, and grooves are formed in the protrusion portions and the recessed portions, uniform and continuous bending-deformation can occur around the protrusion portions and the recessed portions. Accordingly, smooth and continuous elastic compression can be allowed to further improve a sense of use.

In addition, according to the present invention, recessed portions can start bending first, and then protrusion portions can start bending.

In addition, according to the present invention, bending of a recessed portion can provide a stroke while bending of a protrusion portion can relatively provide an elastic force.

In addition, according to the present design, a rigidity of a protrusion portion can be relatively greater than a rigidity of a recessed portion.

DESCRIPTION OF DRAWINGS

A brief description of each drawing is provided to more fully understand the accompanying drawings quoted in the detailed description of the present invention.

MODES OF THE INVENTION

Figure 1:
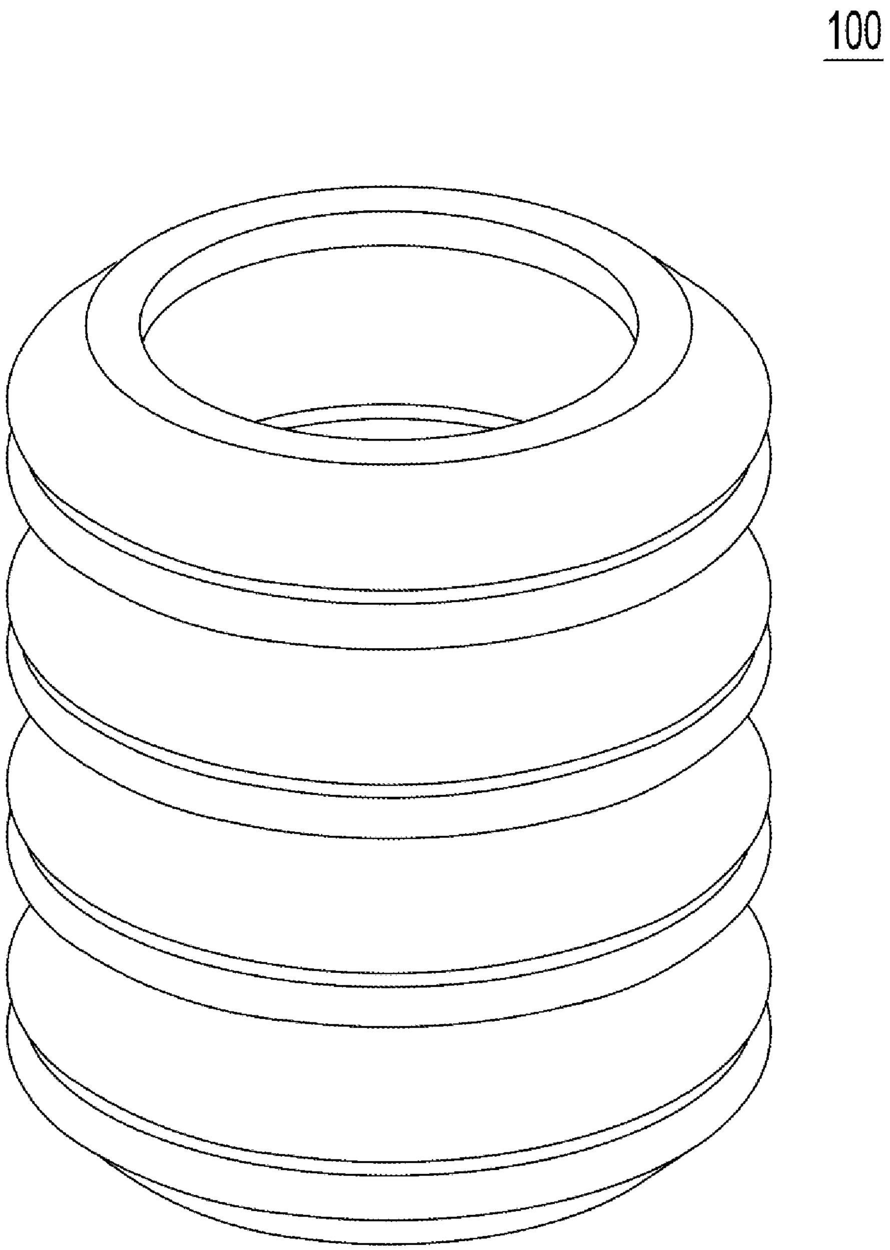
FIG. 1 is a perspective view illustrating an elastic member according to an embodiment of the present invention.

Hereinafter, exemplary embodiments according to the present invention will be described in detail with reference to contents illustrated in the accompanying drawings. In addition, a method of forming and using an apparatus according to the embodiments of the present invention will be described in detail with reference to the contents illustrated in the accompanying drawings. The same reference numerals or symbols refer to parts or components which substantially perform the same function. Upward, downward, left, and right directions, which will be mentioned below, for the sake of convenience are based on the drawings, and the scope of the present invention is not necessarily limited to the corresponding directions.

In addition, although the terms "first," "second," and the like may be used in the present specification to describe various components, these components are not be limited by these terms. These terms are only used to distinguish one component from another component. For example, a first component may be called a second component, and, similarly, a second component may be called a first component without departing from the scope of the present invention. The term "and/or" includes any one or combinations of a plurality of associated items.

In addition, terms used in the present specification are used to describe the exemplary embodiments, and are not intended to limit and/or restrict the embodiments. An expression used in the singular encompasses the expression of the plural unless it has a clearly different meaning in context. In the present specification, it should be understood that the terms such as "including" and "having" are intended to indicate the presence of features, numbers, steps, actions, components, parts, or combinations thereof described in the specification, and are not intended to preclude the possibility that one or more other features, numbers, steps, actions, components, parts, or combinations thereof may be present or added.

Throughout the specification, when a certain part is referred to as being connected to the other part, it includes a case in which the certain part is directly connected to the other part and also includes a case in which the certain part is electrically connected to the other part through another part interposed therebetween. In addition, when a certain part "includes" a certain component, it means that another component may be further included not excluding other components unless otherwise defined.

Figure 2:
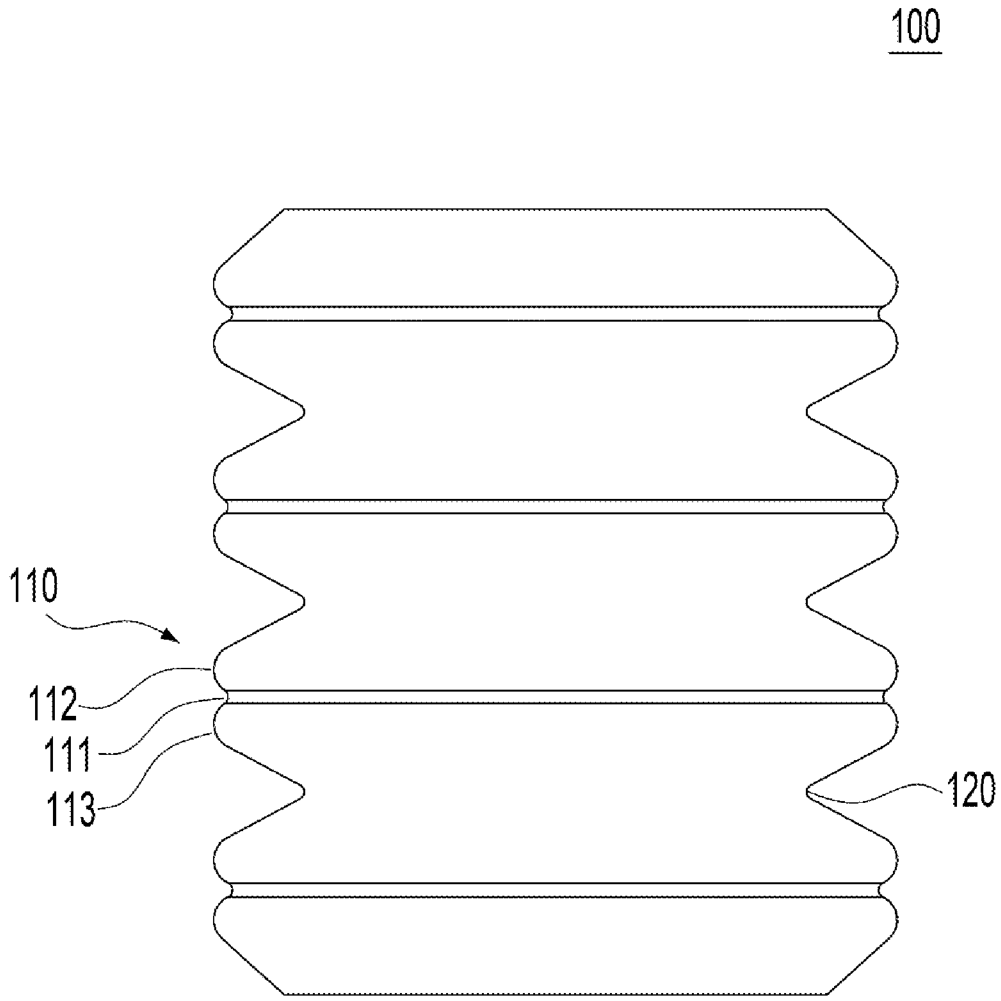
FIG. 2 is a front view illustrating the elastic member according to the embodiment of the present invention.
Figure 3:
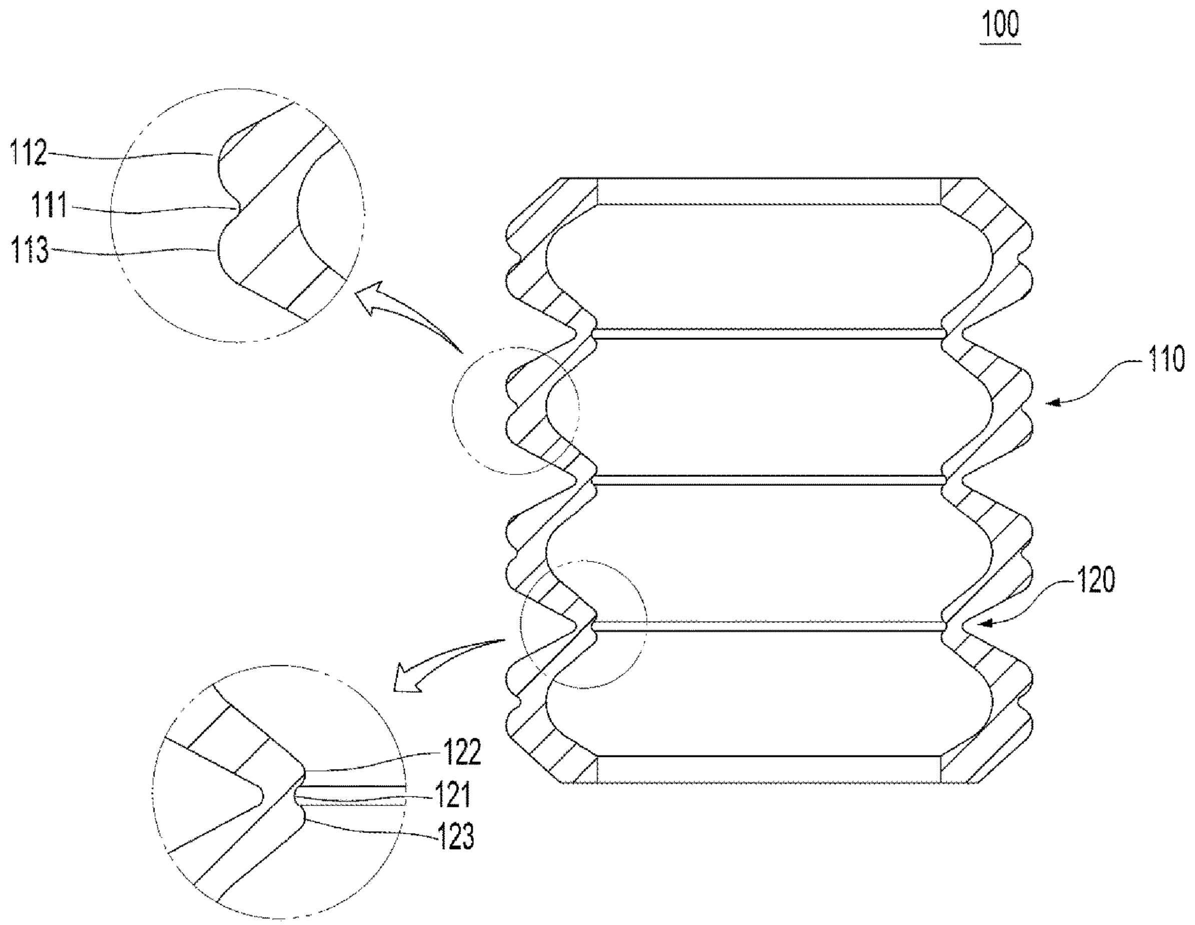
FIG. 3 is a cross-sectional view illustrating the elastic member according to the embodiment of the present invention.
Figure 4:
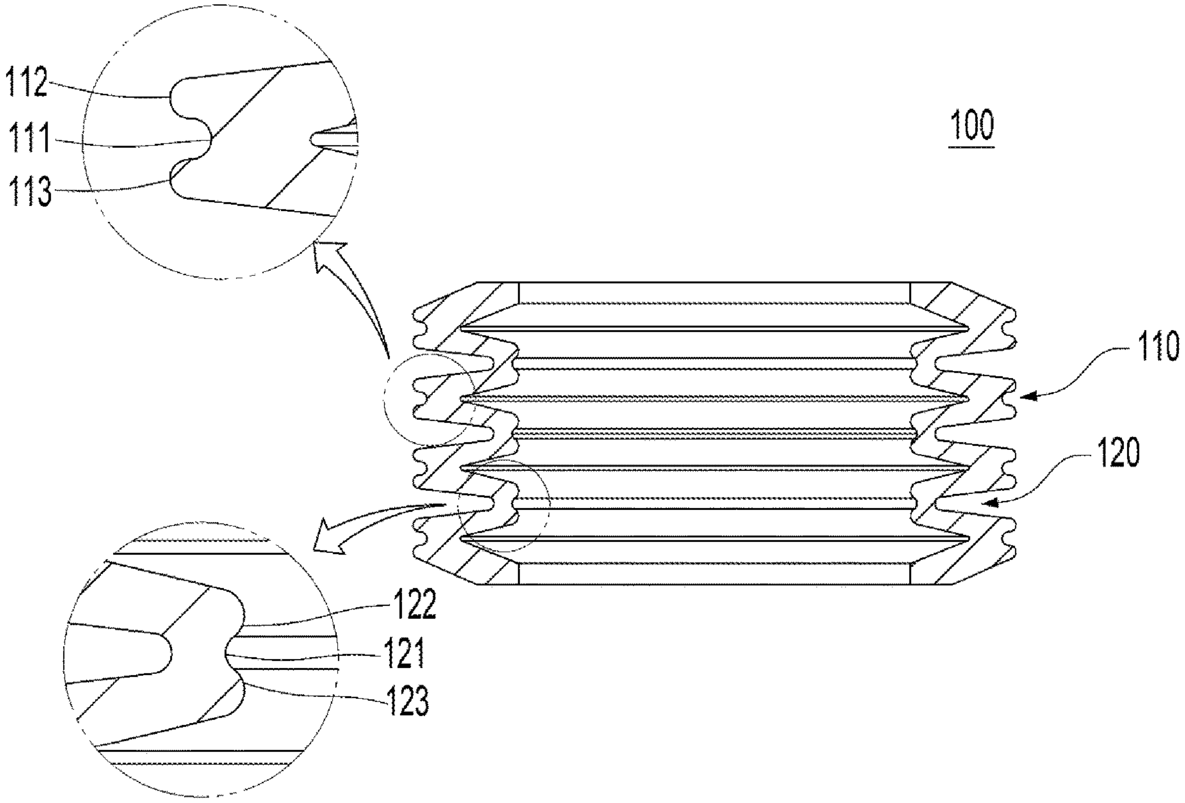
FIG. 4 is a cross-sectional view illustrating the elastic member according to the embodiment of the present invention.

FIG. 1 is a perspective view illustrating an elastic member according to an embodiment of the present invention, and FIG. 2 is a front view illustrating the elastic member according to the embodiment of the present invention. FIG. 3 is a cross-sectional view illustrating the elastic member according to the embodiment of the present invention, and FIG. 4 is a cross-sectional view illustrating the elastic member in a compressed state according to the embodiment of the present invention.

Referring to FIGS. 1 to 4, an elastic member 100 may be compressed and decompressed in a longitudinal direction to exert an elastic force, and the elastic member 100 may be disposed in a pump assembly 200 to allow the pump assembly 200 to perform a pumping operation using the elastic force. In this case, the pump assembly 200 may suction and discharge content through the pumping operation. However, this application is exemplary, and the present invention is not limited thereto.

Specifically, in the elastic member 100, protrusion portions 110 protruding outward and recessed portions 120 recessed inward from the protrusion portions 110 may be repeatedly formed in the longitudinal direction. When the elastic member 100 is pressed, each of the protrusion portions 110 and each of the recessed portions 120 are bending-deformed and elastically compressed, and when the pressurization is released, the protrusion portion 110 and the recessed portion 120 may be recovered to their original states, and the elastic force may be transmitted to the outside.

In the embodiment, a groove 111 or 121 may be formed along a circumference of at least one of the protrusion portion 110 and the recessed portion 120 of the elastic member 100. Due to the groove 111 or 121, a thickness of the protrusion portion 110 and/or the recessed portion 120 may be small compared to that of an adjacent region such that bending is performed around the groove 111 or 121.

In the embodiment, an outer groove 111 may be formed in the protrusion portion 110 of the elastic member 100 to guide bending-deformation of the protrusion portion 110 during elastic compression. Specifically, the outer groove 111 may be formed to be recessed along a circumference of the protrusion portion 110, and thus a pair of outer protrusion portions 112 and 113 may be formed above and below the outer groove 111. During the elastic compression, the outer protrusion portions 112 and 113 may be moved away from each other around the outer groove 111, and thus the protrusion portion 110 may be bending-deformed. In particular, the bending-deformation of the protrusion portion 110 may be adjusted by a recess depth, a recess size, and the like of the outer groove 111, and thus an elastic force and a compression distance of the elastic member 100 may be adjusted.

In the embodiment, an inner groove 121 may be formed in the recessed portion 120 of the elastic member 100 along an inner circumference and may guide bending-deformation of the protrusion portion 110 and the recessed portion 120 during the elastic compression. Specifically, the inner groove 121 may be formed to be recessed along a circumference of the protrusion portion 110, and thus a pair of inner protrusion portions 122 and 123 may be formed above and below the inner groove 121. During the elastic compression, the inner protrusion portions 122 and 123 may be moved away from each other around the inner groove 121, and thus the recessed portion 120 may be bending-deformed. In particular, a speed or size of the bending-deformation of the recessed portion 120 may be adjusted by a recess depth, a recess size, and the like of the inner groove 121, and thus an elastic force and the compression distance of the elastic member 100 may be adjusted.

In the embodiment, the protrusion portion 110 and the recessed portion 120 of the elastic member 100 may be bending-deformed at the same time.

In the embodiment, the protrusion portion 110 and the recessed portion 120 of the elastic member 100 may be sequentially bending-deformed. For example, bending-deformation of the protrusion portion 110 may start first and then bending-deformation of the recessed portion 120 may start, or bending-deformation of the recessed portion 120 may start first, and then bending-deformation of the protrusion portion 110 may start.

In the embodiment, in the elastic member 100, a thickness of a region in which bending-deformation starts first may be smaller than a thickness of a region in which bending-deformation starts later. For example, a thickness of the recessed portion 120 may be formed smaller than a thickness of the protrusion portion 110 such that bending-deformation of the recessed portion 120 starts first, and then bending-deformation of the protrusion portion 110 may start. Such a difference in thickness may be achieved using the grooves formed in the protrusion portion 110 and the recessed portion 120. However, the present invention is not limited thereto.

In the embodiment, a thickness may increase from the recessed portion 120 toward the protrusion portion 110 and decrease from the protrusion portion 110 toward the recessed portion 120. That is, a strength of the protrusion portion 110 may be greater than a strength of the recessed portion 120 such that the protrusion portion 110 exerts a relatively greater elastic force and the recessed portion 120 provides a relatively longer stroke (that is, a compression distance).

In the embodiment, the elastic member 100 may be implemented as a bellows type elastic member. That is, the protrusion portion 110 and the recessed portion 120 may be formed along a circumference of the elastic member 100 to seal a side surface of the elastic member 100.

In the embodiment, the elastic member 100 may be formed so that at least one region of the side surface is open. To this end, in the elastic member 100, a plurality of protrusion portions 110 spaced apart from each other in a horizontal direction and a plurality of recessed portions 120 recessed inward from the protrusion portions 110 and spaced apart from each other may be repeatedly formed in the longitudinal direction. In this case, the recessed portions 120 may be formed separately or connected to each other through a part such as a bridge. In addition, the protrusion portions 110 and/or the recessed portions 120 which are spaced apart from each other may face each other in opposite directions. However, the present invention is not limited thereto.

In the embodiment, at least a part of the elastic member 100 may be formed of a soft plastic material. For example, the elastic member 100 may include polyether ether ketone (PEEK), polycarbonate (PC), polyoxymethylene (POM), polyketone (POK), polybutylene terephthalate (PBT), polypropylene (PP), polyethylene (PE), polyoxypropylene (POP), elastomer, polyolefin elastomer (POE), or the like. However, the present invention is not limited thereto.

In the embodiment, the elastic member 100 may be manufactured through an injection molding process. Accordingly, more stable performance of the elastic member 100 can be provided compared to the case such of a blow molding process and the like. For example, when the elastic member 100 is the bellows type elastic member, the elastic member 100 is generally manufactured through the blow molding process, and in this case, there is a problem that a thickness of the elastic member 100 is not uniform. However, in the case of the injection molding process, since such a nonuniform thickness problem does not occur, a defect rate can be reduced, and an asymmetric elasticity problem can also be solved. However, this is exemplary, and the elastic member 100 may be manufactured through other molding methods such as a blow molding method.

In the embodiment, the elastic member 100 may further include an upper support (not shown) and a lower support (not shown) provided under the upper support. In this case, the protrusion portions 110 and the recessed portions 120 may be repeated in the longitudinal direction to connect the upper support and the lower support. In this case, a hollow is formed inward in each of the upper support and the lower support so that a hollow of the elastic member 100 may allow a stem 250 and the like of the pump assembly 200 to be positioned at the inside. Each of the upper support and the lower support may have, for example, a circular ring shape. However, the present invention is not limited thereto.

The elastic member 100 illustrated in FIGS. 1 to 4 is exemplary, and various configurations thereof may be applied according to embodiments to which the present invention is applied.

Figure 5:
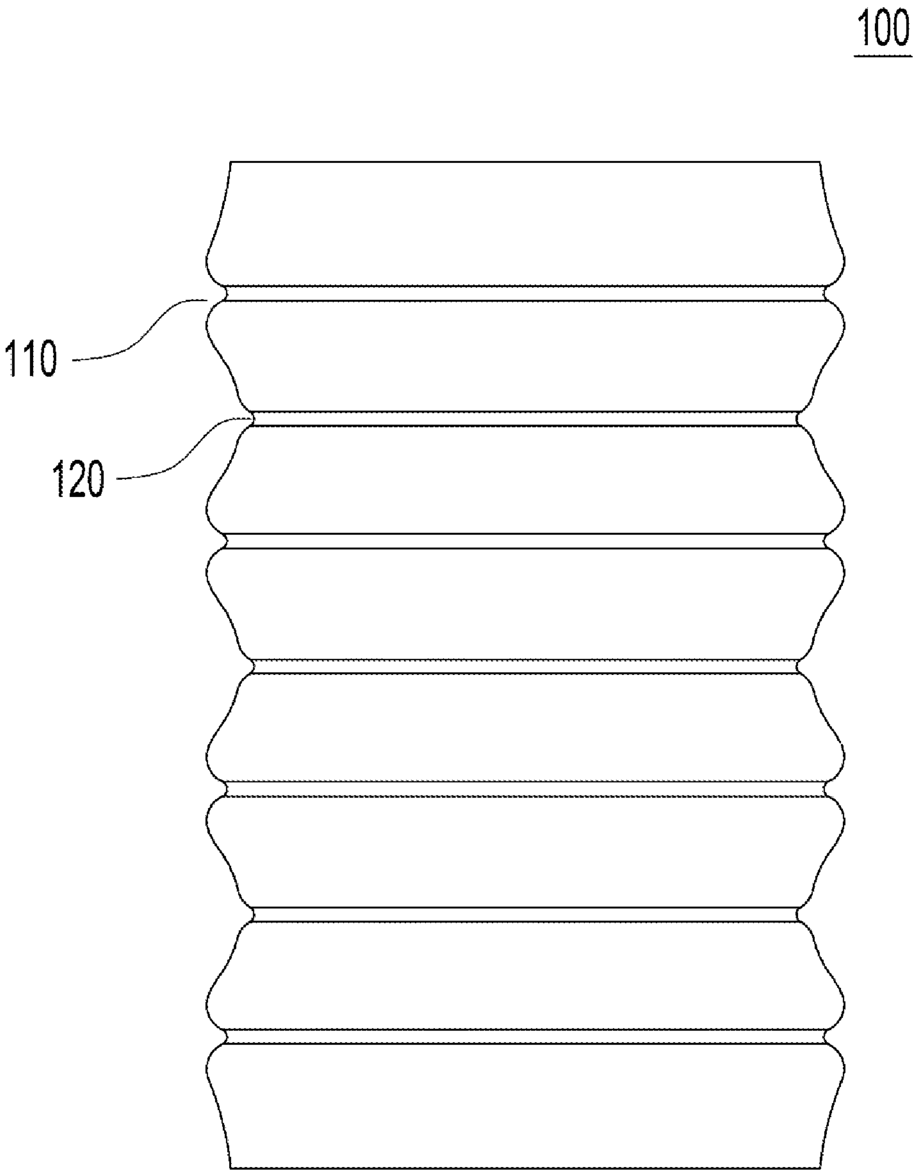
FIG. 5 is a perspective view illustrating the elastic member according to the embodiment of the present invention.
Figure 6:
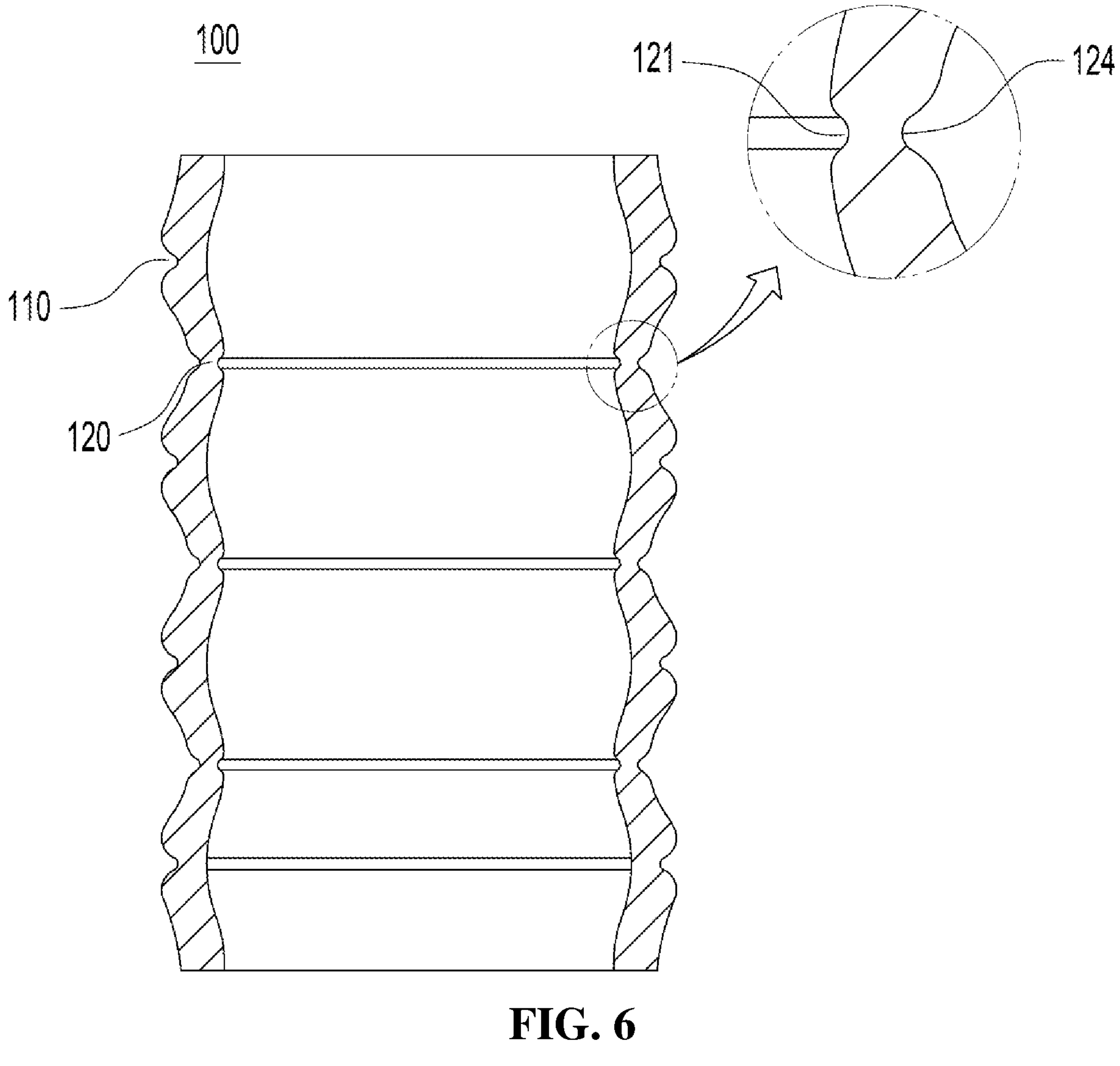
FIG. 6 is a cross-sectional view illustrating the elastic member according to the embodiment of the present invention.

FIG. 5 is a front view illustrating the elastic member according to the embodiment of the present invention, and FIG. 6 is a cross-sectional view illustrating the elastic member according to the embodiment of the present invention.

Referring to FIG. 5 and FIG. 6, an auxiliary groove 124 may be formed along the outer circumference of the elastic member 100 in the recessed portion 120 of the elastic member 100. Due to the auxiliary groove 124, the recessed portion 120 may be more easily bending-deformed, and a size of the bending-deformation may increase. Accordingly, the compression distance (that is, the stroke) of the elastic member 100 may increase during the elastic compression.

The elastic member 100 illustrated in FIGS. 5 and 6 is exemplary, and various configurations thereof may be applied according to embodiments to which the present invention is applied. For example, an additional groove 124 may also be formed additionally/alternatively in the protrusion portion 110.

Figure 7:
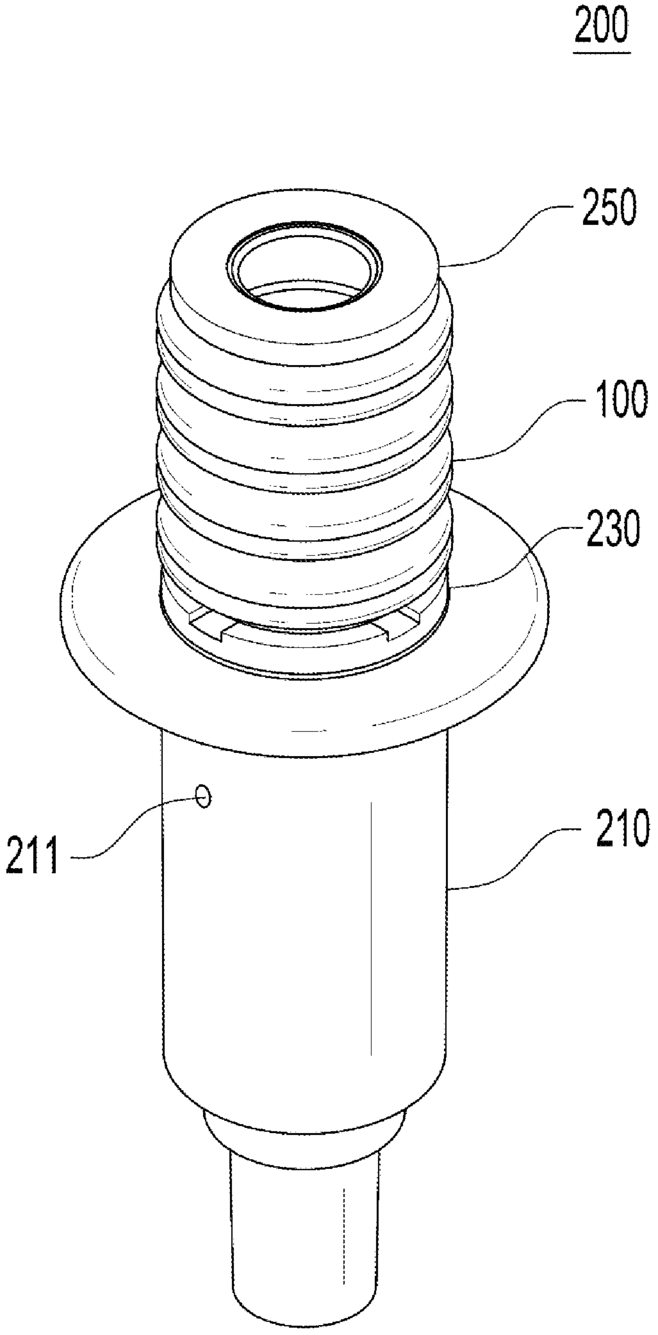
FIG. 7 is a perspective view illustrating a pump assembly according to the embodiment of the present invention.
Figure 8:
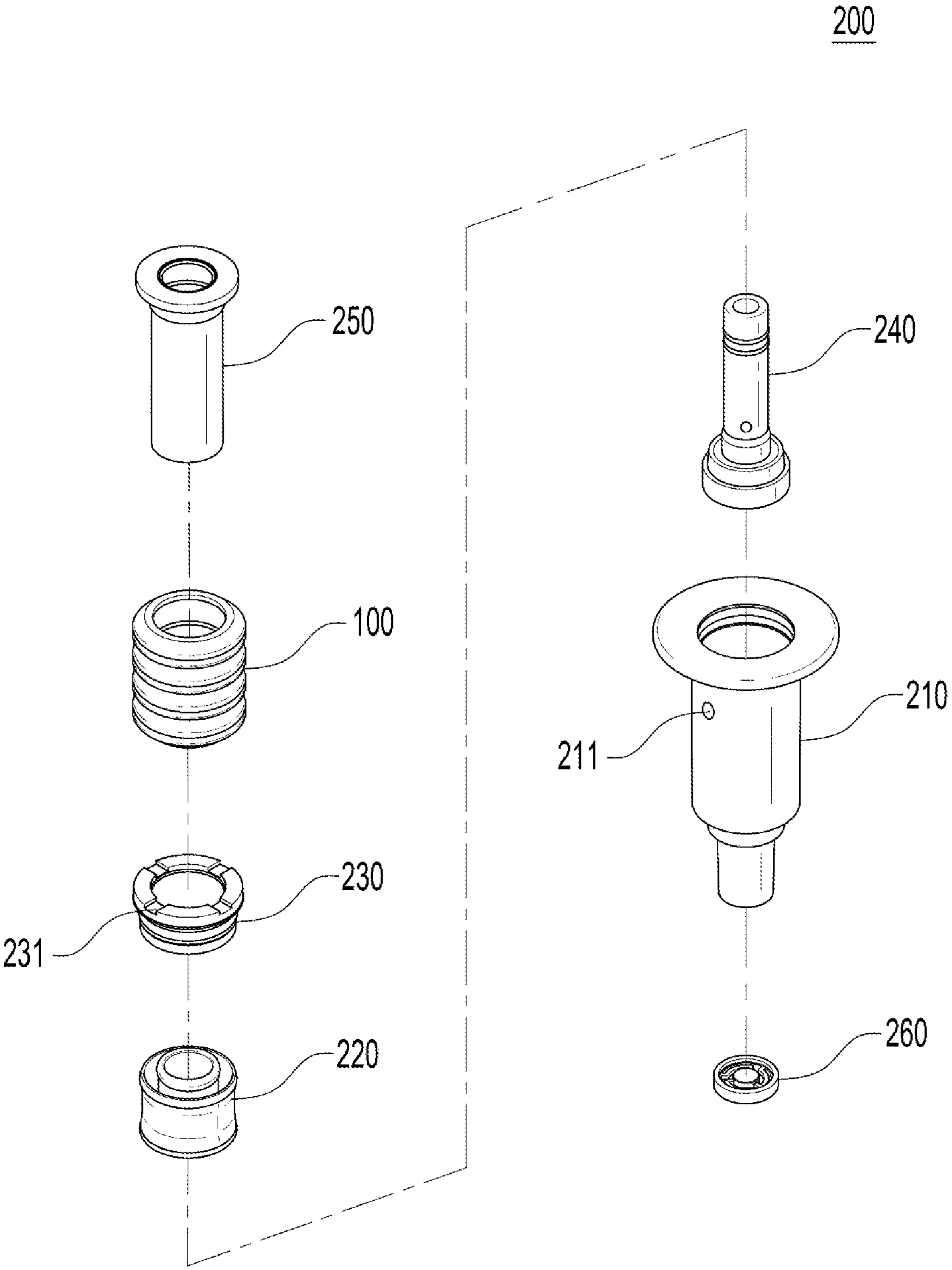
FIG. 8 is an exploded view illustrating the pump assembly according to the embodiment of the present invention.
Figure 9:
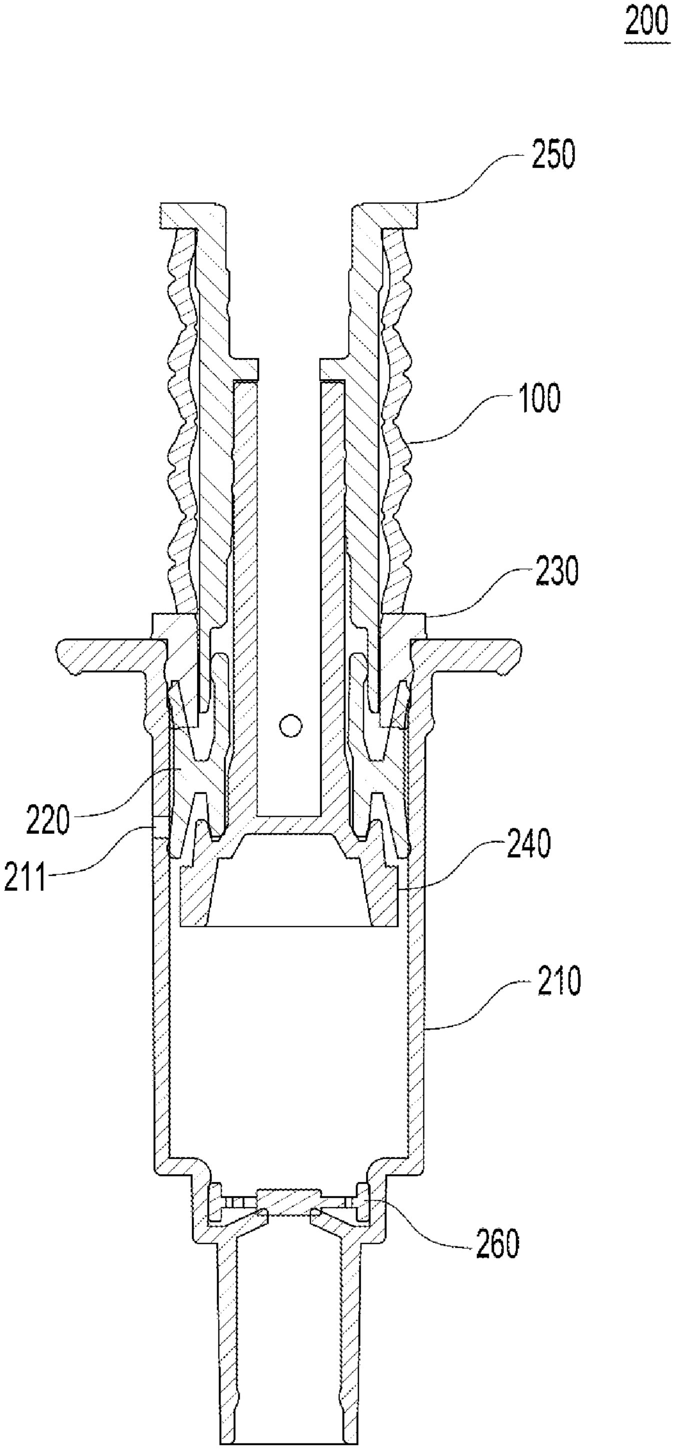
FIG. 9 is a cross-sectional view illustrating the pump assembly according to the embodiment of the present invention.

FIG. 7 is a perspective view illustrating the pump assembly according to the embodiment of the present invention, FIG. 8 is an exploded view illustrating the pump assembly according to the embodiment of the present invention, and FIG. 9 is a cross-sectional view illustrating the pump assembly according to the embodiment of the present invention.

Referring to FIGS. 7 to 9, the pump assembly 200 may receive an external force from a user, change a pressure therein, and suction and discharge content and, specifically, include a cylinder 210, a seal cap 220, a supporting part 230, a piston rod 240, a stem 250, a valve 260, and the elastic member 100.

The cylinder 210 may provide a space which vertically passes through the cylinder 210 and through which the content is introduced and discharged. The cylinder 210 is positioned inside a spout of a container (not shown), and a mounting wing is formed at an outer side of the cylinder 210 such that the cylinder 210 may be mounted on the spout of the container. A lower end of the cylinder 210 may be formed to extend inward in the container, and an entrance which communicates with the container may be formed in the lower end thereof.

In the embodiment, a communication hole 211 may be formed in an upper end of the cylinder 210. The communication hole 211 may allow the inside of the cylinder 210 to communicate with the container. Specifically, in a state in which the seal cap 220 is positioned at a lower side of the cylinder 210 by a pressure being applied to the elastic member 100, when the pressurization to the elastic member 100 is released, the elastic member 100 may be elastically restored, and thus the seal cap 220 may move upward. As the content in the container is introduced into the cylinder 210 during this process, a negative pressure may be generated in the container. In this case, since the communication hole 211 communicates with the container and the cylinder 210 (particularly, an upper side of the seal cap 220 of the cylinder 210), the negative pressure is eliminated, and the content may be more smoothly introduced into the cylinder 210. In addition, when the elastic member 100 is completely restored, the seal cap 220 may be positioned in an upper region of the cylinder 210 and seal the communication hole 211 to block communication with the container. For example, as the communication hole 211 is positioned between an upper disc and a lower disc of the seal cap 220, the communication hole 211 may be sealed. Accordingly, the content of the container may be prevented from flowing into the cylinder 210.

The seal cap 220 is for opening or closing the piston rod 240, and an outer surface of the seal cap 220 may be in close contact with the cylinder 210, and an inner surface thereof may be in close contact with the piston rod 240. An lower end of the inner surface of the seal cap 220 may be in close contact with a supporting portion of the piston rod 240 to seal an inlet of the piston rod 240, and when the piston rod 240 moves downward with respect to the seal cap 220, a lower end of the seal cap 220 may move away from the supporting portion of the piston rod 240, and thus the inlet may be opened and communicated with the inside of the cylinder 210.

In the embodiment, the seal cap 220 may include the upper disc and the lower disc. Each of the upper disc and lower disc may be in close contact with an inner wall of the cylinder 210. In addition, when the elastic member 100 is not compressed, the communication hole 211 of the cylinder 210 may be positioned between the upper disc and the lower disc of the seal cap 220.

The supporting part 230 may be formed on the upper end of the cylinder 210. The elastic member 100 may be provided on the supporting part 230 such that the supporting part 230 may support the elastic member 100. In addition, at least one communication path 231 may be formed in an upper end surface of the supporting part 230. At least some regions of the upper end surface of the supporting part 230 may protrude to form the communication path 231, and the protruding regions may support the elastic member 100, and the inside of the elastic member 100 may air-communicate with the outside through the communication path 231 formed between the protruding regions. Specifically, when the elastic member 100 is pressed, compressed air in the elastic member 100 may be discharged to the outside through the communication path 231, and conversely, when the pressurization to the elastic member 100 is released, external air may be introduced into the elastic member 100 through the communication path 231.

The piston rod 240 may be provided in the cylinder 210, a lower side of the piston rod 240 may be surrounded by the seal cap 220, and an upper side thereof may be connected to the stem 250. The piston rod 240 may have a hollow tube shape, the inlet which is opened or closed by the seal cap 220 may be formed in the lower side of the piston rod 240, and an outlet through which the content introduced through the inlet is discharged may be formed in the upper side of the piston rod 240. In addition, the supporting portion may be formed on a lower end of the piston rod 240, and when the lower end of the inner surface of the seal cap 220 is in close contact with the supporting portion, the inlet may be sealed from an inner space of the cylinder 210. The piston rod 240 may be vertically moved in the cylinder 210 through the stem 250. When the piston rod 240 moves downward, the lower end of the inner surface of the seal cap 220 may be separated from the supporting portion, and thus the inlet may be opened such that the content in the cylinder 210 may be introduced into the piston rod 240. When the piston rod 240 continuously moves, the content may be discharged through the outlet and then discharged through a discharge hole of a nozzle 330 through the stem 250. When the piston rod 240 moves upward, the cylinder 210 may seal the inlet of the piston rod 240, a negative pressure is generated in the cylinder 210, and the content in a container portion 310 may be introduced into the cylinder 210.

The stem 250 may be coupled to the piston rod 240 to vertically move upward or downward with the piston rod 240. Specifically, for example, the stem 250 may move downward to move the piston rod 240 downward when an external force is applied through the nozzle 330 or the like and may move upward to move the piston rod 240 upward when the external force is removed. A wing part which protrudes outward along a circumference of the stem 250 may be formed on an upper end of the stem 250. An upper end of the elastic member 100 may be supported by a lower surface of the wing part. In addition, the stem 250 may be formed so that an upper portion and a lower portion communicate with each other such that the content introduced from the piston rod 240 may move upward.

The valve 260 may be provided at the entrance or provided adjacent to the entrance of the lower end of the cylinder 210. The valve 260 may be a backflow prevention valve 260, may seal the entrance when an internal pressure of the cylinder 210 is a positive pressure, and may open the entrance when the internal pressure of the cylinder 210 is changed to a negative pressure.

The elastic member 100 is for restoring a position of the piston rod 240, a lower end the elastic member 100 may be supported by the supporting part 230, and the upper end thereof may be supported by the stem 250. When the user presses the pump assembly 200, the elastic member 100 may be compressed as the stem 250 moves downward. In this case, the piston rod 240 coupled to the stem 250 may move downward together. In addition, when the user releases the pressurization, the elastic member 100 may be elastically restored and restore the stem 250 upward. In this case, the piston rod 240 connected to the stem 250 may move upward together.

The pump assembly 200 illustrated in FIG. 7 to FIG. 9 is exemplary, and various configurations thereof may be applied according to embodiments to which the present invention is applied.

Figure 10:
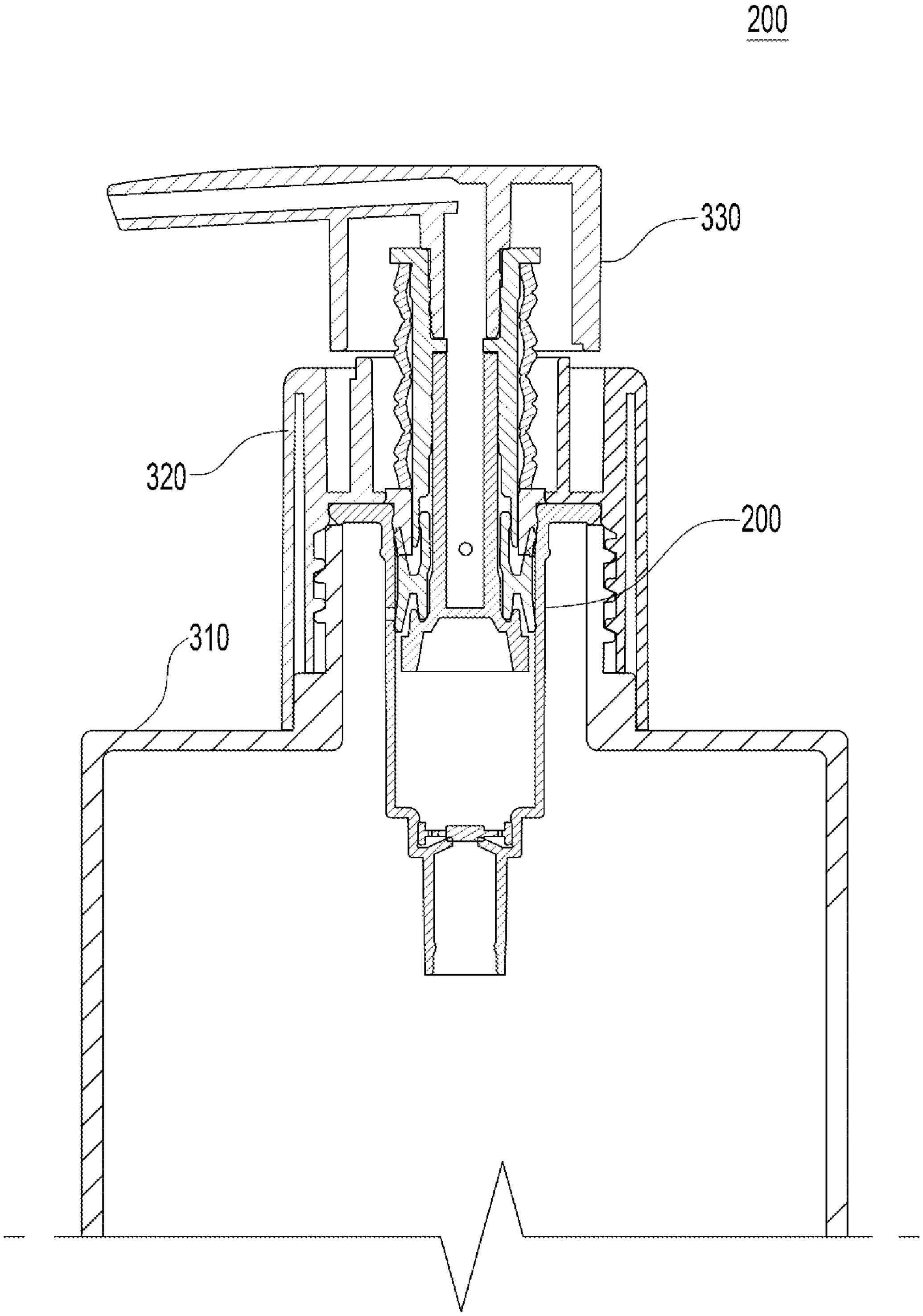
FIG. 10 is a cross-sectional view illustrating a content container according to the embodiment of the present invention.

FIG. 10 is a cross-sectional view illustrating a content container according to the embodiment of the present invention.

Referring to FIG. 10, a content container 300 may include the container portion 310, a head part 320, the nozzle 330, and the pump assembly 200.

The container portion 310 may provide a storage space in which the content is accommodated. The content accommodated in the container portion 310 may be discharged to the outside through the nozzle 330 or the like and used by the user. In this case, the content may be, for example, a solid, liquid, gel or powder cosmetic product. However, the present invention is not limited thereto, and the content may include a material in various types or with various components which may be contained in the container portion 310 and discharged through the nozzle 330. In addition, the container portion 310 is illustrated in a bottle type but is exemplary, and the container portion 310 in various types such as a tube may be applied.

The pump assembly 200 (for example, the wing part of the cylinder 210) may mounted on an upper end of the container portion 310. The content accommodated in the container portion 310 may be discharged to the outside by the pump assembly 200. The head part 320 may be coupled to an outer side of a spout of the container portion 310. A space in which the pump assembly 200 is provided and a space in which a part of the nozzle 330 moves may be provided inside/outside the head part 320, and the head part 320 and the container portion 310 may be coupled to fixedly press the pump assembly 200.

The nozzle 330 may receive an external force from the user, transmit the external force to the pump assembly 200, and discharge the content discharged from the pump assembly 200 to the outside. An upper side of the nozzle 330 may receive the external force from the user such that the nozzle 330 moves vertically, and a lower side of the nozzle 330 may be in contact with the piston rod 240. Upward and downward movement of the nozzle 330 may cause upward and downward movement of the piston rod 240.

The content container 300 illustrated in FIG. 10 is exemplary, and various configurations thereof may be applied according to embodiments to which the present invention is applied.

As described above, while the embodiments have been described with reference to specific embodiments and drawings, various modifications and alterations may be made by those skilled in the art from the above description. In addition, each embodiment may be operated in combination with each other as necessary. Therefore, other implementations, other embodiments, and equivalents with the appended claims are included in the range of the claims described below.

The invention claimed is:

1. An elastic member comprising:

a protrusion portion on an outer side of the elastic member;

a recessed portion on an inner side of the elastic member, wherein a pair of the protrusion portion and the recessed portion are repeatedly formed in a longitudinal direction; and an outer groove defined in the protrusion portion along an outer circumference of the elastic member, wherein a thickness of the elastic member continuously increases throughout an entire region extending from an innermost point of the recessed portion to an adjacent outermost point of the protrusion portion, and wherein a rigidity of the protrusion portion is greater than a rigidity of the recessed portion.

2. The elastic member of claim 1, wherein:

the protrusion portion has a pair of outer protrusion portions disposed on both sides of the outer groove; and the pair of the outer protrusion portions are configured to deform and move away from each other with respect to the outer groove during elastic compression.

3. The elastic member of claim 1, wherein an inner groove is defined in the recessed portion along an inner circumference of the elastic member, and wherein the outer groove and the inner groove are configured to deform during an elastic compression.

4. The elastic member of claim 3, wherein:

an auxiliary groove is formed on an outer side of the elastic member at a location corresponding to the recessed portion; and the auxiliary groove is configured to allow an increased compression distance of the elastic member during the elastic compression.

5. The elastic member of claim 3, wherein at least one of an elastic force, a compression distance and a bending order is adjusted by a recess depth and a recess size of at least one of the outer groove and the inner groove.

6. The elastic member of claim 1, wherein the elastic member is a bellows type elastic member, and the protrusion portion and the recessed portion are formed along a circumference of the elastic member to seal a side surface of the elastic member.

7. The elastic member of claim 2, wherein an inner concave portion is defined on the inner side of the elastic member at a position corresponding to the protrusion portion, wherein the inner concave portion is a single-peak curve extending across a region radially inward of the protrusion portion.

8. The elastic member of claim 7, wherein a peak of the single-peak curve is positioned between respective peaks of the pair of outer protrusion portions.

9. The elastic member of claim 1, wherein the elastic member is formed of at least one soft plastic material selected from the group consisting of polyether ether ketone (PEEK), polycarbonate (PC), polyoxymethylene (POM), polyketone (POK), polybutylene terephthalate (PBT), polypropylene (PP), polyethylene (PE), polyoxypropylene (POP), elastomer, and polyolefin elastomer (POE).

10. The elastic member of claim 1, wherein the recessed portion is configured to bend before a bending-deformation of the protrusion portion during elastic compression.

11. The elastic member of claim 1, wherein bending of the recessed portion provides a relatively longer compression distance than bending of the protrusion portion, and bending of the protrusion portion provides a relatively greater elastic force than bending of the recessed portion.

12. The elastic member of claim 1, wherein the innermost point of the recessed portion is closest to a longitudinal axis of the elastic member, and the adjacent outermost point of the protrusion portion is farthest from the longitudinal axis.

13. The elastic member of claim 1, wherein a maximum thickness of the elastic member is located at the adjacent outermost point of the protrusion portion, and a minimum thickness of the elastic member is located at a valley of the recessed portion.

14. The elastic member of claim 1, wherein the adjacent outermost point of the protrusion portion is directly adjacent to the innermost point of the recessed portion.

15. The elastic member of claim 3, wherein:

the recessed portion has a pair of inner protrusion portions disposed on both sides of the inner groove; and the pair of inner protrusion portions deform and move away from each other with respect to the inner groove during the elastic compression.

16. A pump assembly comprising:

an elastic member having:

a protrusion portion on an outer side of the elastic member, a recessed portion on an inner side of the elastic member, wherein a pair of the protrusion portion and the recessed portion are repeatedly formed in a longitudinal direction, an outer groove defined in the protrusion portion along an outer circumference of the elastic member, and an inner groove defined in the recessed portion along an inner circumference of the elastic member, wherein the outer groove and the inner groove are configured to deform during an elastic compression, and wherein a rigidity of the protrusion portion is greater than a rigidity of the recessed portion;

a cylinder of which a first portion and a second portion are open and in which a hollow is formed;

a seal cap disposed on an inner wall of the cylinder;

a supporting part being positioned underneath the elastic member to provide support;

a piston rod having an inlet which is configured to open or close by the seal cap formed at a lower end of the piston rod and a passage connected to the inlet extending to an upper end of the piston rod; and a stem coupled to the piston rod to move upward or downward with the piston rod, wherein the elastic member is provided between the stem and the supporting part and provides an elastic force from the supporting part toward the stem.

17. The pump assembly of claim 16, wherein:

protruding regions are disposed on an upper end of the supporting part, and at least one communication path is defined by the protruding regions; and an air inside the elastic member communicates with outside air through the at least one communication path.

18. The pump assembly of claim 16, wherein a communication hole is formed at an upper end of the cylinder, communicates with a container, which is coupled to the pump assembly, to eliminate a negative pressure within the container.

* * * * *